United States Patent
Frank et al.

(10) Patent No.: US 10,292,164 B2
(45) Date of Patent: May 14, 2019

(54) METHOD AND APPARATUS FOR OPTIMIZATION OF VIDEO TRANSMISSIONS

(71) Applicant: NOKIA SOLUTIONS AND NETWORKS OY, Espoo (FI)

(72) Inventors: Philipp Frank, Köngen (DE); Roland Antonius Woelker, Espoo (FI); Mikko Tapani Suni, Espoo (FI); Mika Maurits Aalto, Espoo (FI); Maunu Elias Holma, Helsinki (FI); Luis Angel Maestro, San Francisco, CA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 64 days.

(21) Appl. No.: 14/892,807

(22) PCT Filed: May 23, 2013

(86) PCT No.: PCT/EP2013/060598
§ 371 (c)(1),
(2) Date: Nov. 20, 2015

(87) PCT Pub. No.: WO2014/187490
PCT Pub. Date: Nov. 27, 2014

(65) Prior Publication Data
US 2016/0113002 A1    Apr. 21, 2016

(51) Int. Cl.
| H04W 4/00 | (2018.01) |
| H04W 72/04 | (2009.01) |
| H04L 1/00 | (2006.01) |
| H04W 52/34 | (2009.01) |
| H04W 52/24 | (2009.01) |

(Continued)

(52) U.S. Cl.
CPC ........ *H04W 72/048* (2013.01); *H04L 1/0014* (2013.01); *H04W 52/243* (2013.01); *H04W 52/267* (2013.01); *H04W 52/343* (2013.01); *H04W 72/082* (2013.01)

(58) Field of Classification Search
CPC ............. H04W 72/048; H04W 52/243; H04W 52/267; H04W 72/082; H04W 52/343; H04L 1/0014
USPC ................. 370/252, 254, 329, 330, 328
See application file for complete search history.

(56) References Cited

U.S. PATENT DOCUMENTS

| 6,219,343 B1 | 4/2001 | Honkasalo et al. |
| 2004/0180701 A1* | 9/2004 | Livet ............... H04W 52/0261 455/574 |

(Continued)

FOREIGN PATENT DOCUMENTS

| WO | WO 2007/034286 A1 | 3/2007 |
| WO | WO 2012/126964 A1 | 9/2012 |

OTHER PUBLICATIONS

International Search Report & Written Opinion dated Nov. 7, 2013 corresponding to International Patent Application No. PCT/EP2013/060598.

*Primary Examiner* — Chuong T Ho
(74) *Attorney, Agent, or Firm* — Squire Patton Boggs (US) LLP

(57) ABSTRACT

A method comprises selecting, for at least a part of a set of data to be transmitted to a user equipment in cell, a bit rate, said bit rate being selected in dependence on radio conditions associated with said user equipment in said cell.

9 Claims, 6 Drawing Sheets

(51) Int. Cl.
*H04W 52/26* (2009.01)
*H04W 72/08* (2009.01)

(56) References Cited

U.S. PATENT DOCUMENTS

| | | | |
|---|---|---|---|
| 2009/0021572 A1* | 1/2009 | Garudadri | H04L 47/10 348/14.01 |
| 2010/0009694 A1* | 1/2010 | Fischer | H04M 3/5158 455/452.1 |
| 2010/0135170 A1* | 6/2010 | Fan | H04W 28/16 370/252 |
| 2010/0142432 A1* | 6/2010 | Leung | H04L 12/1886 370/312 |
| 2010/0316066 A1* | 12/2010 | Leung | H04N 21/44209 370/468 |
| 2011/0307935 A1 | 12/2011 | Kotecha | |
| 2012/0064908 A1 | 3/2012 | Fox et al. | |
| 2012/0329497 A1* | 12/2012 | Yamazaki | H04W 52/243 455/501 |
| 2013/0065562 A1 | 3/2013 | Singh | |
| 2013/0332075 A1* | 12/2013 | Wang | G01C 21/3453 701/527 |
| 2014/0010267 A1* | 1/2014 | Jacob | H04L 1/20 375/219 |
| 2014/0074961 A1* | 3/2014 | Liu | H04L 67/1095 709/213 |
| 2014/0161050 A1* | 6/2014 | Grinshpun | H04L 65/4069 370/329 |
| 2015/0156243 A1* | 6/2015 | Skog | H04L 65/605 709/219 |

* cited by examiner

METHOD AND APPARATUS FOR OPTIMIZATION OF VIDEO TRANSMISSIONS

Some embodiments relate to methods and apparatus and in particular but not exclusively to methods and apparatus for use in allocation of resource for data transmission.

A communication system can be seen as a facility that enables communications between two or more entities such as a communication device, e.g. mobile stations (MS) or user equipment (UE), and/or other network elements or nodes, e.g. Node B or base transceiver station (BTS), associated with the communication system. A communication system typically operates in accordance with a given standard or specification which sets out what the various entities associated with the communication system are permitted to do and how that should be achieved.

Wireless communication systems include various cellular or other mobile communication systems using radio frequencies for sending voice or data between stations, for example between a communication device and a transceiver network element. Examples of wireless communication systems may comprise public land mobile network (PLMN), such as global system for mobile communication (GSM), the general packet radio service (GPRS) and the universal mobile telecommunications system (UMTS).

A mobile communication network may logically be divided into a radio access network (RAN) and a core network (CN). The core network entities typically include various control entities and gateways for enabling communication via a number of radio access networks and also for interfacing a single communication system with one or more communication systems, such as with other wireless systems, such as a wireless Internet Protocol (IP) network, and/or fixed line communication systems, such as a public switched telephone network (PSTN). Examples of radio access networks may comprise the UMTS terrestrial radio access network (UTRAN) and the GSM/EDGE radio access network (GERAN).

A geographical area covered by a radio access network is divided into cells defining a radio coverage area provided by a transceiver network element, such as a base station or Node B. A single transceiver network element may serve a number of cells. A plurality of transceiver network elements is typically connected to a controller network element, such as a radio network controller (RNC). A user equipment or mobile station may download data which is transmitted by the base station via radio resources. Different UE may share a radio resource provided by the transceiver network element. However, the number of UE and the requirements of each UE will change.

According to an aspect, there is provided a method comprising: selecting, for at least a part of a set of data to be transmitted to a user equipment in cell, a bit rate, said bit rate being selected in dependence on radio conditions associated with said user equipment in said cell.

The selecting may comprise determining for a candidate bit rate, an associated required power.

The determining may comprise determining said associated required power in dependence on radio condition information.

The radio condition information may comprise interference dependent information.

The interference dependent information may be an average bit rate achievable by said user equipment.

The selecting may comprise determining for said user equipment a candidate maximum power.

The determining may comprise determining said candidate maximum power in dependence on one or more parameters.

The one or more parameters may comprise one or more of location of said user equipment in said cell, subscription of said user equipment, type of user equipment, type of service required by the user equipment, and signal strength.

A value associated with said parameter may be selected for each of a plurality of user equipment such that a total of each of said values satisfies a condition.

Each value divided by said total value may determine a respective share of a total available power.

The total available power may be dependent on loading in said cell.

The method may comprise comparing information on said associated required power and candidate maximum power to determine if said candidate bit rate is supportable.

The method may comprise using said selected bit rate to determine the bit rate with which said at least a part of said set of data is to be transmitted.

The method may comprise running at least one iterative algorithm to select a respective bit rate for a plurality of user equipment in a cell such that a total power associated with said respective bit rates is less than or equal to a total available power.

The data to be transmitted may be transmitted with a non-guaranteed bit rate.

The set of data may comprise video content.

The set of data may comprise streamed data.

The set of data may be HTTP protocol data.

According to another embodiment, there is provided an apparatus which is configured to perform the previous method(s).

A computer program comprising program code means adapted to perform the method(s) may also be provided. The computer program may be stored and/or otherwise embodied by means of a carrier medium.

According to another aspect, there is provided an apparatus comprising: means for selecting, for at least a part of a set of data to be transmitted to a user equipment in cell, a bit rate, said bit rate being selected in dependence on radio conditions associated with said user equipment in said cell.

The selecting means may comprise means for determining for a candidate bit rate, an associated required power.

The determining means may be for determining said associated required power in dependence on radio condition information.

The radio condition information may comprise interference dependent information.

The interference dependent information may be an average bit rate achievable by said user equipment.

The selecting means may comprise means for determining for said user equipment a candidate maximum power.

The determining means may be for determining said candidate maximum power in dependence on one or more parameters.

The one or more parameters may comprise one or more of location of said user equipment in said cell, subscription of said user equipment, type of user equipment, type of service required by the user equipment, and signal strength.

A value associated with said parameter may be selected for each of a plurality of user equipment such that a total of each of said values satisfies a condition.

Each value divided by said total value may determine a respective share of a total available power.

The total available power may be dependent on loading in said cell.

The apparatus may comprise means for comparing information on said associated required power and candidate maximum power to determine if said candidate bit rate is supportable.

The apparatus may comprise means for using said selected bit rate to determine the bit rate with which said at least a part of said set of data is to be transmitted.

The apparatus may comprise means for running at least one iterative algorithm to select a respective bit rate for a plurality of user equipment in a cell such that a total power associated with said respective bit rates is less than or equal to a total available power.

The data to be transmitted may be transmitted with a non-guaranteed bit rate.

The set of data may comprise video content.

The set of data may comprise streamed data.

The set of data may be HTTP protocol data.

According to another embodiment, there is provided an apparatus comprising at least one processor and at least one memory including computer code for one or more programs, the at least one memory and the computer code configured, with the at least one processor, to cause the apparatus at least to: select, for at least a part of a set of data to be transmitted to a user equipment in cell, a bit rate, said bit rate being selected in dependence on radio conditions associated with said user equipment in said cell.

The at least one memory and the computer program code may be configured to, with the at least one processor, cause the apparatus to determine for a candidate bit rate, an associated required power.

The at least one memory and the computer program code may be configured to, with the at least one processor, cause the apparatus to determine said associated required power in dependence on radio condition information.

The radio condition information may comprise interference dependent information.

The interference dependent information may be an average bit rate achievable by said user equipment.

The at least one memory and the computer program code may be configured to, with the at least one processor, cause the apparatus to determine for said user equipment a candidate maximum power.

The at least one memory and the computer program code may be configured to, with the at least one processor, cause the apparatus to determine said candidate maximum power in dependence on one or more parameters.

The one or more parameters may comprise one or more of location of said user equipment in said cell, subscription of said user equipment, type of user equipment, type of service required by the user equipment, and signal strength.

A value associated with said parameter may be selected for each of a plurality of user equipment such that a total of each of said values satisfies a condition.

Each value divided by said total value may determine a respective share of a total available power.

The total available power may be dependent on loading in said cell.

The at least one memory and the computer program code may be configured to, with the at least one processor, cause the apparatus to compare information on said associated required power and candidate maximum power to determine if said candidate bit rate is supportable.

The at least one memory and the computer program code may be configured to, with the at least one processor, cause the apparatus to use said selected bit rate to determine the bit rate with which said at least a part of said set of data is to be transmitted.

The at least one memory and the computer program code may be configured to, with the at least one processor, cause the apparatus to run at least one iterative algorithm to select a respective bit rate for a plurality of user equipment in a cell such that a total power associated with said respective bit rates is less than or equal to a total available power.

The data to be transmitted may be transmitted with a non-guaranteed bit rate.

The set of data may comprise video content.

The set of data may comprise streamed data.

The set of data may be HTTP protocol data.

The apparatus may be provided by one or more of an application server function, a radio resource manager or a controller function. In the above, many different embodiments have been described. It should be appreciated that further embodiments may be provided by the combination of any two or more of the embodiments described above.

Embodiments are described below, by way of example only, with reference to the accompanying drawings, in which.

Figure 5:
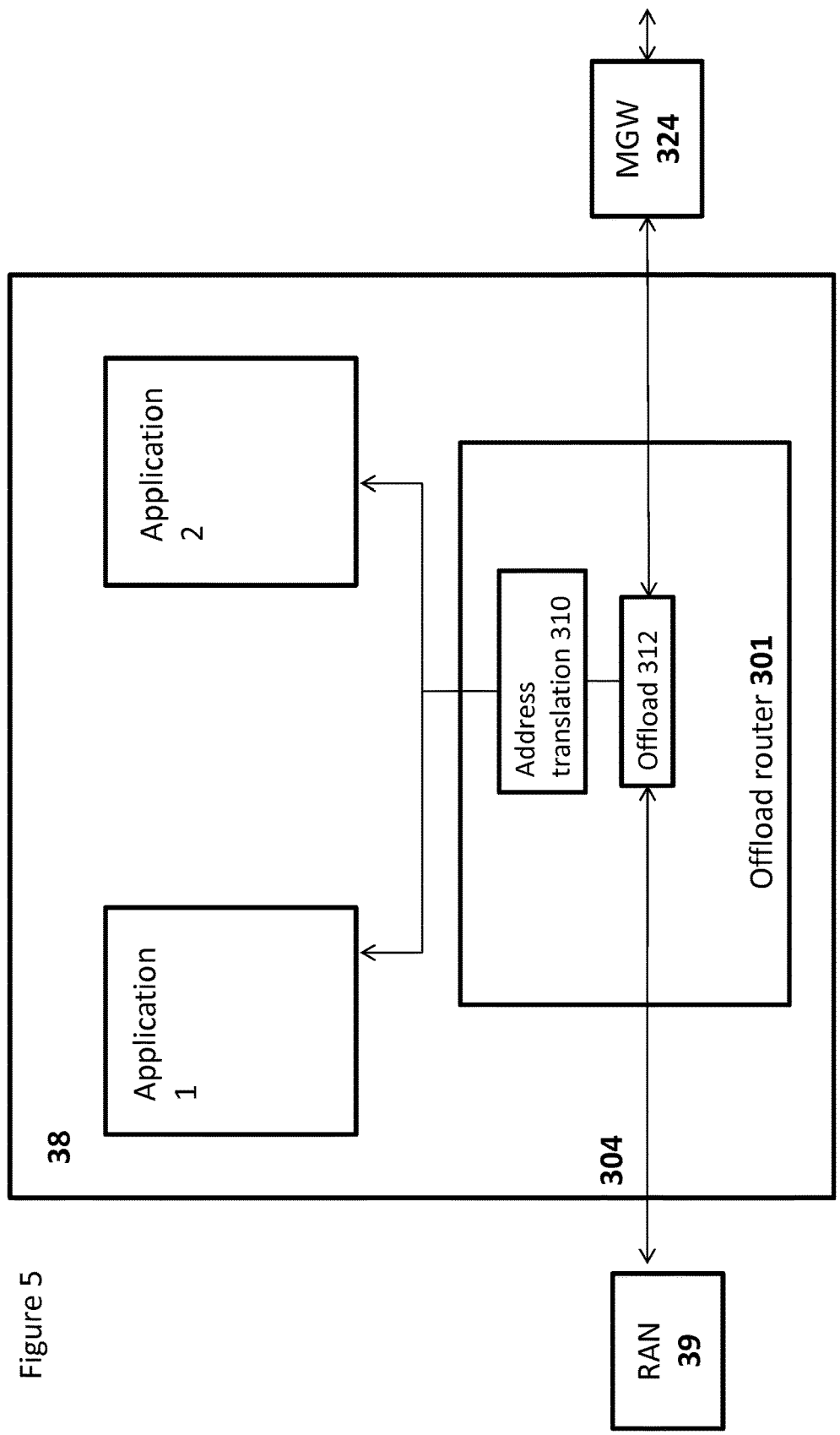

FIG. 5 schematically shows an application server function; and

Figure 6:
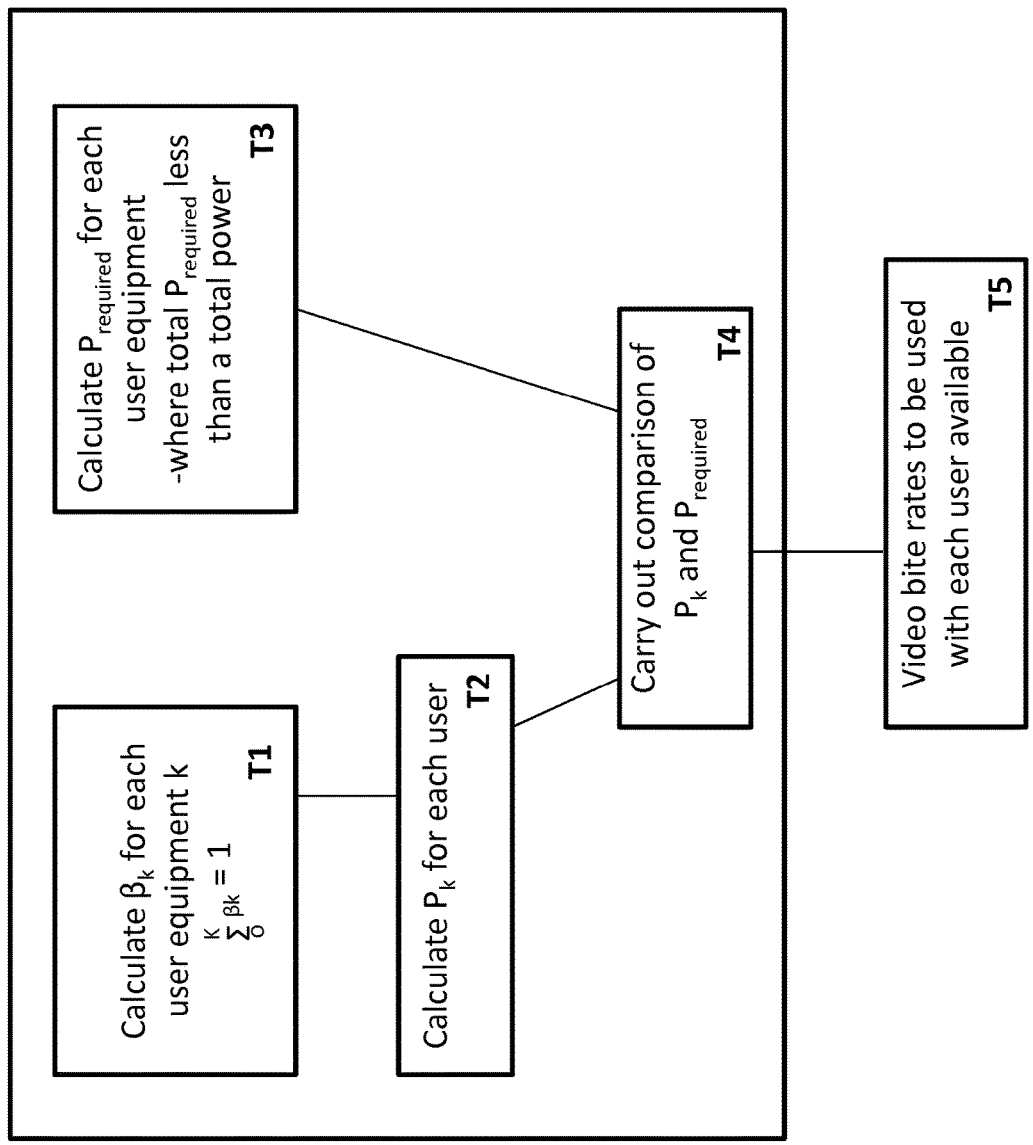

FIG. 6 shows an iterative method of an embodiment.

Embodiments may be used where there are local break out and off load solutions. This may be in the context of a 3GPP radio environment or any other suitable environment. In some embodiments, applications may be deployed to offload points using for example cloud style application deployments.

Local breakout function may provide a mechanism to serve traffic by local applications. In other words, Internet content or the like is brought to a local breakout point. There are many use cases of localization. By way of example, this may be one or more of a local content delivery network (CDN), local transparent caching, local content optimization for a mobile terminal and/or network, local hosting of other kind of services (used by mobile terminals), and local serving of machine-to-machine (M2M) terminals, for example aggregation functions or the like.

Local breakout may be applied alternatively or additionally to other types of radio networks, such as Wi-Fi, WiMax and/or Femto networks. In such embodiments the offload may be between core network and Internet transit/peering.

Some embodiments may integrate a server module or function into the RAN (Radio Access Network). This application server function may be considered to be a RACS (Radio Applications Cloud Server). It should be appreciated that this application server function may be a cloud server or any other suitable server. Other embodiments may alternatively or additionally provide any other suitable functionality to support a localization of an application and/or function.

The RAN may be provided by one or more entities. In some embodiments, the RAN may comprise a BTS (base transceiver station) to which an RNC has been integrated or RNC (radio network controller) in a 3G networks, or an eNB (enhanced Node B) in LTE (Long term evolution). It should be appreciated that other embodiments may alternatively or additionally be used in conjunction with any other suitable standard or system.

The application server function may enable the deployment and hosting of local applications at the RAN side in a virtualization computing environment and applying cloud technologies. The "leaky bearer" offload concept may be applied to gain access to the mobile bearer traffic flows. Alternatively any other suitable mechanism may be used to support localization of one or more applications or functions.

The traffic flows may be IP traffic flows. By way of example the IP traffic flows may comprise one or more of PDP (packet data protocol) context and EPS (evolved packet system) bearer.

Local breakout scenarios are specified in 3GPP release 10 under the name SIPTO (selected IP traffic offload). One of the concepts for 3G networks is the so-called "leaky bearer" traffic flow break-out, also called TOF (Traffic offload). It allows the extracting or inserting of IP flows of an existing mobile bearer based on activated IP flow traffic filters. This is a flexible break-out concept without involvement of or impact on the UE (user equipment). The concept provides local access to mobile bearer traffic flows and in this way is used for the deployment and execution of applications at the RAN like CDN (content delivery network) solutions, content delivery optimization, caching solutions or others. These local applications may benefit from the proximity to the radio (e.g. location awareness, lower latency) and of having access to radio information, e.g. radio cell load, location, UE's specific radio condition.

It should be appreciated that some embodiment may alternatively or additionally use different local breakout techniques other than those discussed above.

Figure 1:
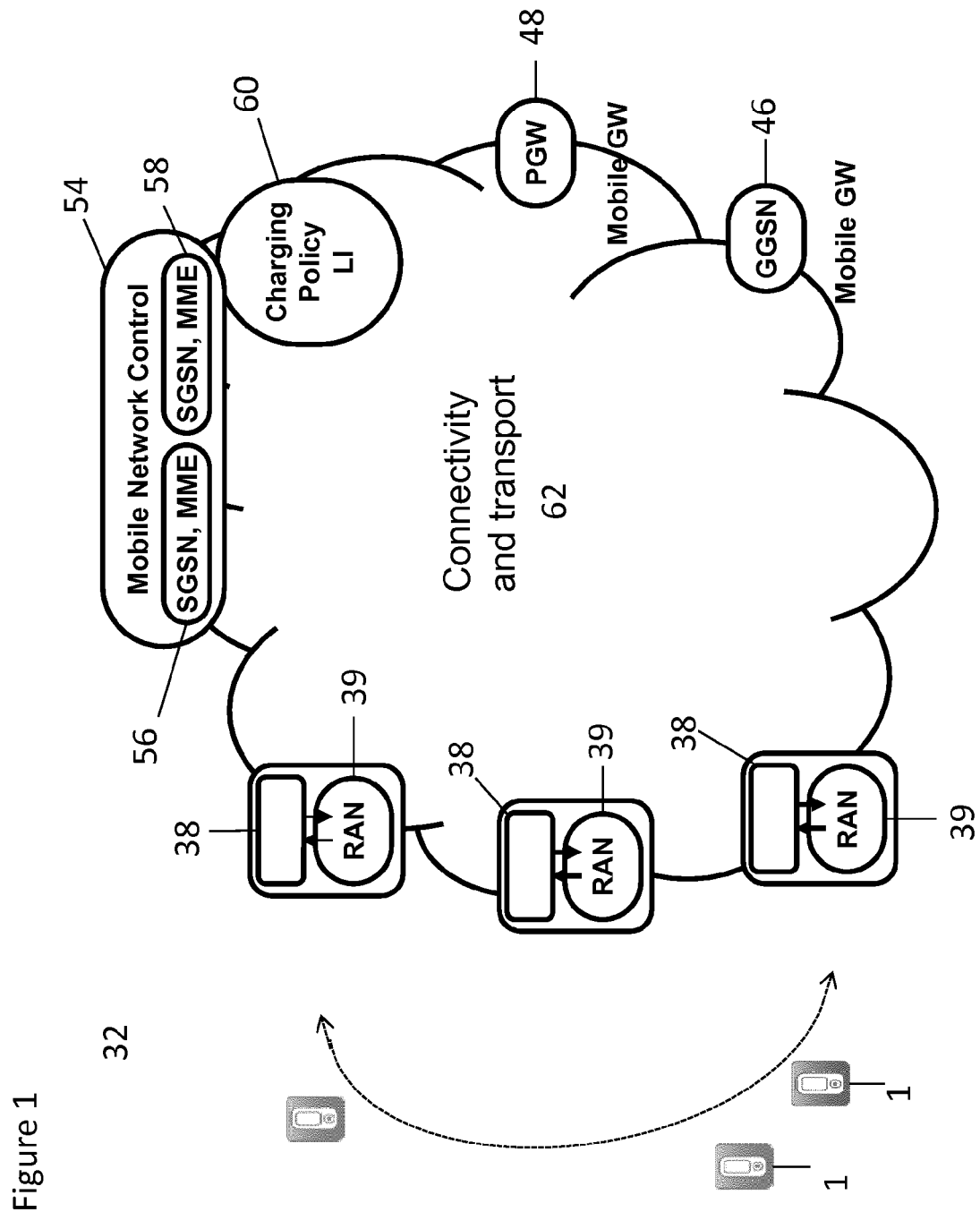
FIG. 1 shows a schematic general overview of a radio access network and a core network according to some embodiments.

Reference is now made to FIG. 1 which shows one example of a schematic architecture. In this example, an application server function 38 may be integrated at the RAN 39 level with an off load capability. The applications which may be supported by the architecture may have distributed and centralized components.

The network architecture broadly comprises a radio access side 32 and a mobile packet core 34. The radio access side comprises user equipment 1. The user equipment are configured to communicate with a respective radio access network. In FIG. 1, a first, second and third radio access networks 39 are shown. Each RAN may comprise one or more access nodes. The access nodes may comprise any suitable access node. Depending on the standard involved, the access node may be a base station such as a node B with at least some RNC functionality or an enhanced node B. The latter refers to the Long Term Evolution (LTE) of the Universal Mobile Telecommunications System (UMTS) standardized by 3GPP (Third Generation Partnership Project). A controller for the base stations may be provided. In some standards, the controller may be a radio network controller. The radio network controller is able to control the plurality of base stations. In other embodiments, a distributed control function is provided and each base station incorporates part of that control function.

Each of the RAN shown in FIG. 1 may be provided with a server or server function such as an application server function. The application server function 38 may be provided by a separate entity or may be integrated with one or more other entities.

The application server function may be integrated with a base station 36 having at least some RNC functionality and/or RNC or any other type of controller. It should be appreciated that other embodiments are additionally or alternatively envisaged such as where server functionality is integrated into a node of the RAN, for example the RNC or the base station having for example RNC functionality. In some embodiments, a physical realization would be a RNC/base station plus server in a same integrated hardware. In some embodiments the physical realization or hardware may be different. A physical realization may be different (for example an integrated one), even though the software functionality may be the same or similar, in some embodiments.

The mobile packet core 34 comprises mobile gateway node 46 and 48. The mobile gateway may be a GGSN (gateway GPRS (General Packet Radio Service) support node) and the mobile gateway 48 may be a (PGW) packet gateway. These gateways are by way of example. One or more other types of gateway may additionally or alternatively be provided in different embodiments. Only one type of gateway may be provided in some embodiments. More than one type of gateway may be provided in other embodiments.

The mobile packet core 34 also comprises a mobile network control part 54. This part comprises SGSNs (serving GPRS Support Node) and MMEs (mobile management entities) entities 56 and 58.

In some embodiments, the mobile packet core 34 may comprise a function 60. This function may provide one or more of a lawful intercept function which allows authorized authorities to monitor communications, policy control function and charging control function. One or more of these functions may be provided separately and/or in different combinations.

The radio access part 32 is able to communicate with the mobile packet core via connectivity and transport function 62.

The application server function 38 may host applications, which can be accessed by subscribers via leaky bearer traffic offload. For example, a subscriber can access applications hosted by the server 38 via the offload of respective IP flows of the subscriber's mobile bearer to the corresponding application.

It is being predicted that the data traffic in cellular networks will exponentially increase in the next few years. One of the drivers for this data growth is video streaming. One example of video streaming is so called over-the-top (OTT) video content which is delivered over the internet, often from third parties such as YouTube. One challenge may be to optimize the video transmission in such a way that a good quality of experience (QoE) is ensured given the actual user device and the network resources which need to be shared.

There is a trend towards delivering video traffic using the hypertext transfer protocol (HTTP) over the transmission control protocol (TCP) instead of using the traditional real time streaming protocol (RTSP) over the user datagram protocol (UDP) which may be unreliable. This is due to the fact that HTTP is simple, scalable and supported by most of the content delivery networks (CDNs). HTTP/TCP based video delivery provides a deterministic video quality and may provide a firewall-friendly transport with commodity HTTP servers.

Nowadays, some video content providers, such as YouTube, employ a HTTP progressive download video streaming method where the video file is downloaded as any data file as quickly as possible. The playing of the video can start as soon as enough data is retrieved and buffered. However, HTTP progressive download has several drawbacks. Before the download can start, the user equipment usually can choose between different video qualities, each represented by a specific bit rate and resolution. Due to the potentially high volatility of the wireless channel, the available bandwidth for each user equipment may vary. On the one hand, this will lead to playback interruptions and re-buffering events due to buffer underflows in case the bit rate of the selected video quality is higher than the available end-to-end bandwidth. On the other hand, users will experience a suboptimal video quality in case the video bit rate is much lower than the available bandwidth. Thus, in case of HTTP progressive download there may be problems with playback interruptions and an inefficient utilization of radio resources with the current video bit rate adaptation techniques.

In order to address the shortcomings of HTTP progressive downloading, a more advanced HTTP streaming approach has emerged. This is sometimes referred to as adaptive HTTP streaming. Adaptive HTTP streaming cuts the raw video content into short fragments (typically corresponding to 2-10 seconds video duration) and encodes each of these fragments at different bit rates. The video client requests these short video fragments according to the actual available bandwidth in order to ensure continuous playback. However, HTTP adaptive streaming also has problems. The client may be able to detect its own TCP throughput and therefore reduce the video bit rate if the measured throughput is decreasing. However, the video bit rate reduction may be delayed in this case. The selected bit rate may not be an optimal one because the client is only able to observe its own situation. This is because the client has no knowledge about the overall network situation, i.e. the actual cell load or the other users competing for radio resources. Furthermore, each client may adapt differently to changing network conditions depending on their implementation, i.e. some of them may switch video qualities in a more conservative way while others do so more aggressively.

Another problem is that some clients may also request several video qualities of the same video fragment when adapting to the changing radio conditions. The client may select one quality per fragment for the video play out. This means that thus many already downloaded video fragments are discarded resulting in a waste of radio resources.

The inventors have recognized that one problem with regard to video optimization is that no accurate radio information is taken into account. Currently video optimization is performed in the core network relying on long-term measurements of limited radio or network information such as the round trip time (RTT) of the TCP packets.

Since current video optimizing systems have no accurate information about the actual radio conditions of each individual user, the video bit rate adaptation is delayed and inaccurate. This in turn leads to the video content being delivered in a non-resource-efficient way because the video optimization is performed irrespective of the user location. Users located at the cell-edge with poor channel conditions may require more radio resources and/or time to obtain the same amount of data as users located at the cell center with good radio conditions.

Current cell load is an indicator for video optimization and may be reliably estimated by means of accurate radio information. Therefore, in some embodiments the radio awareness may be taken into account when adapting the video bit rate. In some embodiments, the video quality requested by the clients may be controlled and modified if needed based on the actual radio conditions.

In some embodiments, an optimal video bit rate for each individual streaming user is determined. This may maximize the QoE, given the actual radio conditions. In some embodiments, a downlink power requirement is estimated depending on the required video bit rate for HSDPA (High Speed Downlink Packet Access). In some embodiments an accurate cell load indicator may be determined. This cell load indicator may be used to efficiently control or adapt the video quality based on the cell congestion.

The downlink power requirement estimation for HSDPA may be based on one or more radio parameters that are available, for example, at the BS or radio network controller (RNC), such as the total allocated transmission power, average SINR and number of active users.

Figure 2:
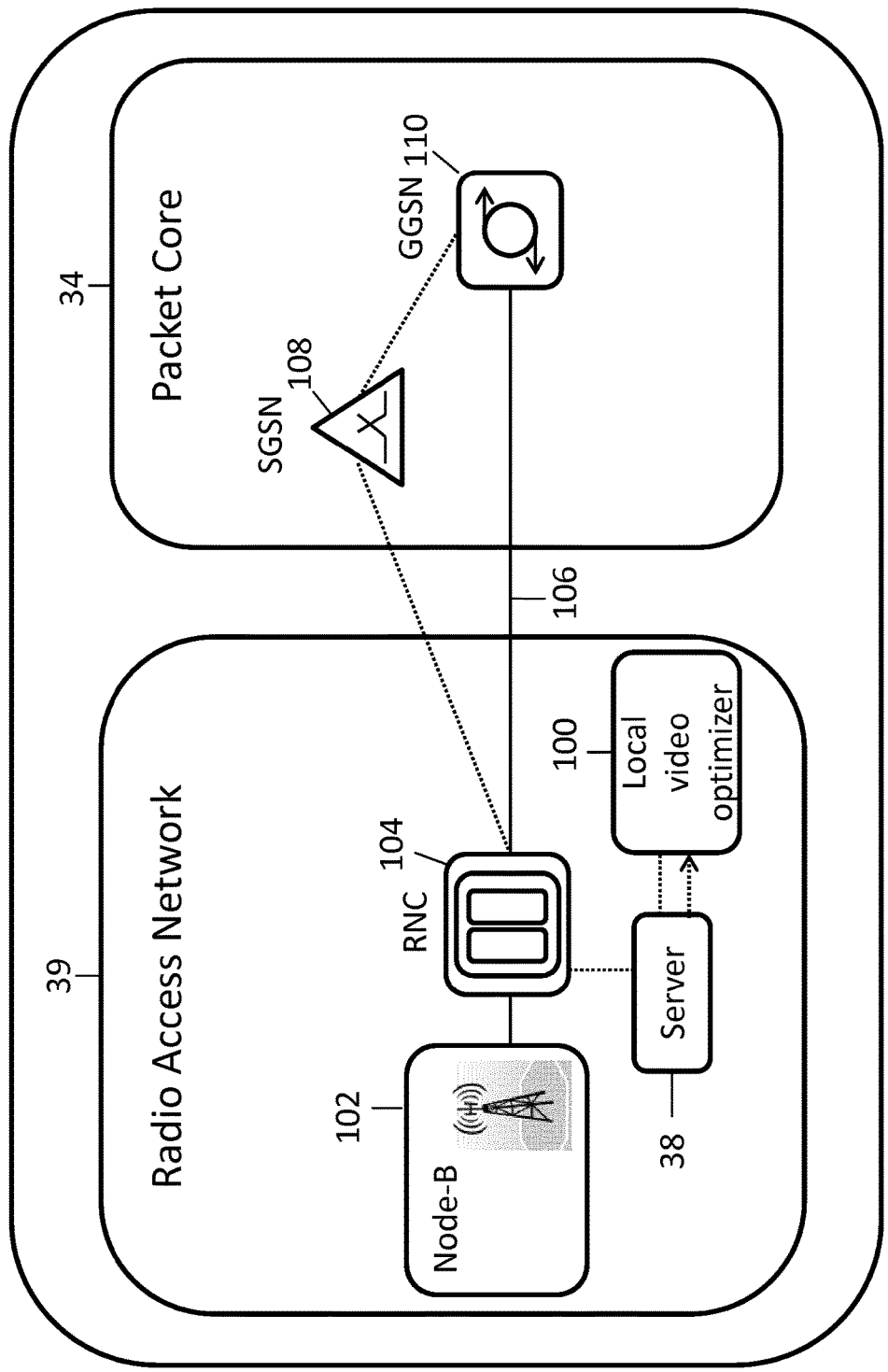
FIG. 2 shows a schematic view of a first embodiment with local video optimization.

Reference is made to FIG. 2 which schematically shows an arrangement with an entity which may be a local video optimizer. As schematically shown, the radio access network 39 comprises a nodeB 102. The nodeB is controlled by a radio network controller 104. A local application server or server function 38 is provided in the radio access network. The server 38 is configured to communicate with a local video optimizer 100 provided in the radio access network. The communication between the server and the local video optimizer will be described in more detail later.

The packet core 34 comprises a SGSN 108 and a GGSN 110. A link 106 is provided between the RNC and GGSN. Links between the RAN and the GGSN 110 are also provided via the SGSN 108.

Figure 3:
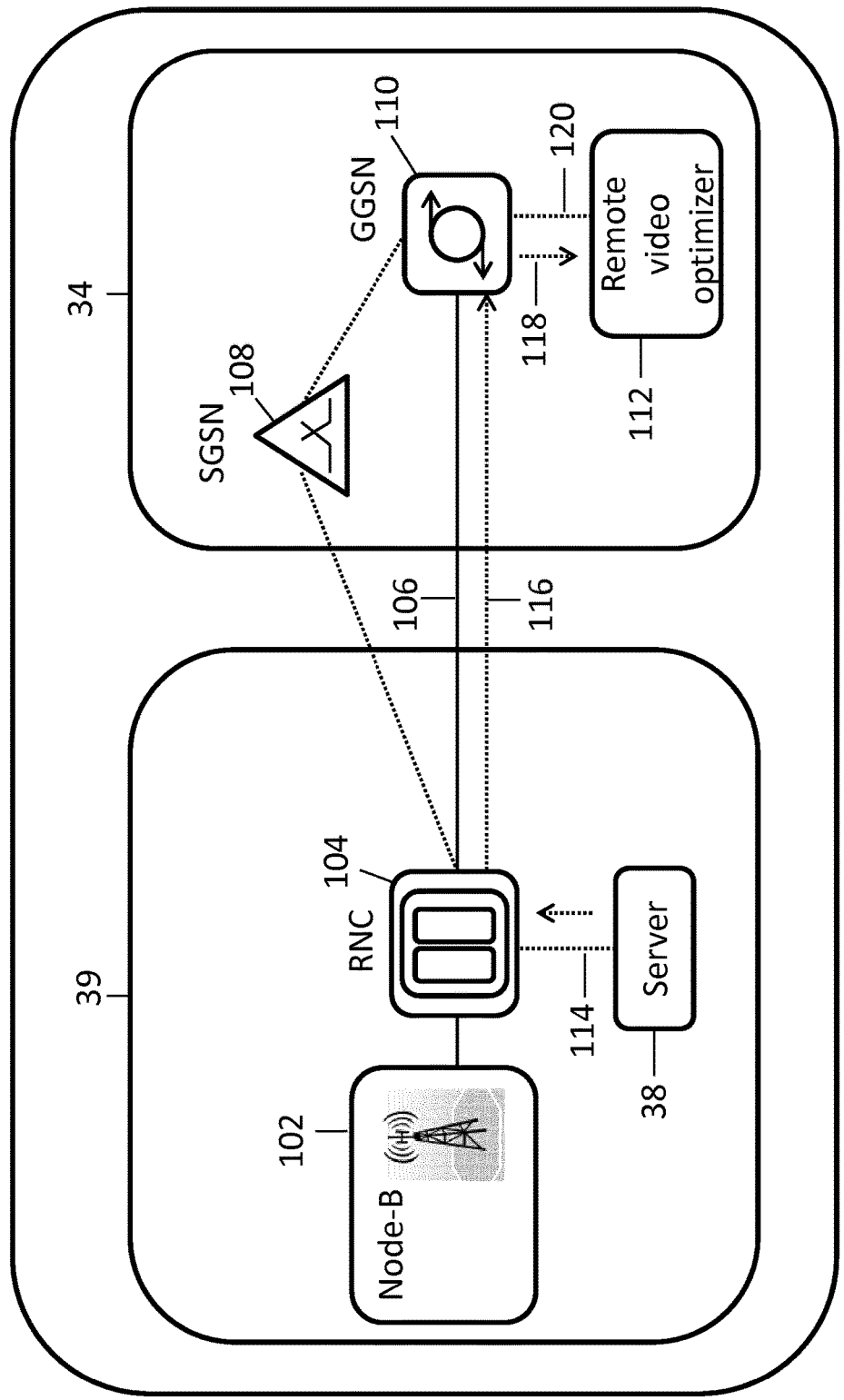
FIG. 3 shows a schematic view of a second embodiment remote video optimization.

Reference is made to FIG. 3 which shows an arrangement with a remote video optimizer 112. The elements of the radio access network 39 of FIG. 3 are as described in relation to FIG. 2, but without the video optimizer. The radio access network thus comprises a node B 102, RNC 104 and local application server 38.

The packet core 34 has the same elements as described in relation to FIG. 2 with the addition of a remote video optimizer 112. The function of the remote video optimizer 112 will be described in more detail later.

In relation to the arrangements of FIGS. 2 and 3, a content or video optimizer is shown. This is only one an example of an entity that could provide information to the application server function. This information may alternatively or additionally be obtained from other suitable entity, e.g. content servers. In some embodiments the application server function may obtain the required information via one or more other applications executed in the application server function.

Figure 4:
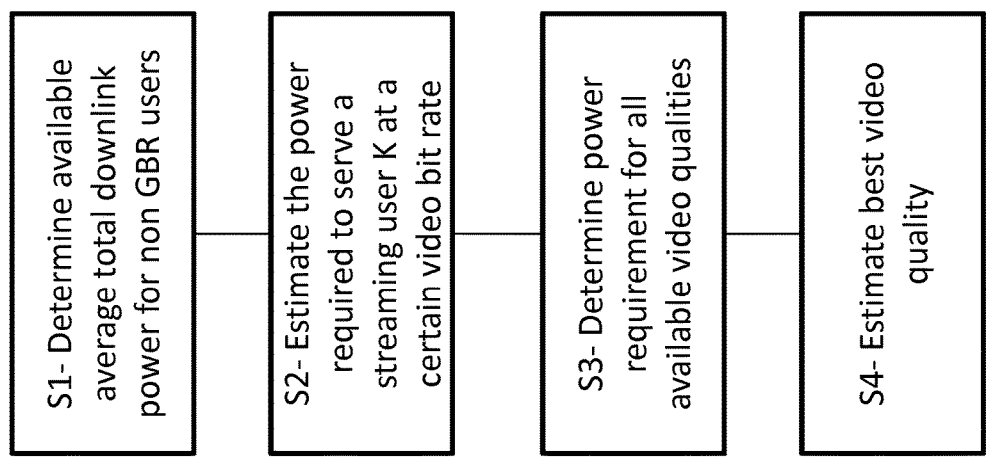
FIG. 4 shows a method of an embodiment.

A method will now be described with reference to FIG. 4. Video streaming is in general mapped to the interactive traffic class without a guaranteed bit rate (GBR). In step S1, the available downlink power for a non GBR user may be estimated. This step may be performed in a radio resource management function in the application server function and/or in a controller such as a radio network controller. In some embodiments, available downlink power estimation may be used for admission control purposes.

In some embodiments, the average downlink power for a non GBR user is estimated. In some embodiments, a total downlink power available for non GBR users may be determined. In some embodiments, the available average total downlink power for non-GBR users may be obtained. In some embodiments, this may be expressed as $$P_{non-GBR} = \frac{1}{N}\sum_{n=1}^{N} P'_{non-GBR}(n), \quad (1)$$

where N is the number of transmission time intervals (TTIs) of the measurement period and $P'_{non-GBR}(n)$ the total available power for non-GBR users for each of the N TTIs. In some embodiments, the measurement period N may be smaller than the play out duration of a video fragment in order to observe changing conditions for each fragment.

In some embodiments, $P'_{non-GBR}(n)$ can be measured at the BS. In some embodiments $P'_{non-GBR}(n)$ may be determined at the RNC, for example by subtracting the required power for GBR users and/or the required power for wideband code division multiple access (WCDMA) Release '99 and/or the like from the total downlink power available for HSDPA. Any other suitable method for determining the downlink power for one or more non-GBR users may be alternatively or additionally used.

In step S2, having determined the average available total power the power required to serve a video streaming user k at a certain video bit rate can be determined. This step may be performed in a radio resource management function in the application server function and/or in a controller such as a radio network controller. In some embodiments, this may be estimated as $$P_{required,k} = P_{non-GBR} \cdot \frac{VBR_k}{ABR_k}, \quad (2)$$

where $VBR_k$ is the current video bit rate of user k and $ABR_k$ the average bit rate (the average bit rate over N TTIs) that can be achieved by user k assuming the total non-GBR downlink power $P_{non-GBR}$ would be assigned to this user, i.e. user k would be the only user in the cell. Usually, but not necessarily ABR will be larger and in some cases much larger than VBR. The downlink power $P_{required,k}$ is an estimation of the fraction of the total available power that is required to serve user k at a video bit rate $VBR_k$. $P_{required,k}$ may be a reliable short-term indication of the actual radio conditions for user k because the $ABR_k$ depends on the average SINR, reflecting the current channel conditions and hence taking the user location into account.

In some embodiments, $P_{required,k}$ is determined for a plurality of different possible video bit rates. The different bit rates may be available to for example the application server function and/or the controller. The different bit rates may be made available by the video content provider in some way. For example the information may be provided in information accompanying the data. In some embodiments the application server function and/or controller may determine the one or more different bit rates.

It should be appreciated that alternatively or additionally, one or more other methods may be used to determine a power required to serve a given user at a given video bit rate may be used. One or more methods may use information which takes into account one or more of use location and/or cell load.

The determination of a suitable video quality (video bit rate) for each individual user divided into two steps. In some embodiments, the video bit rate will be an optimal video bit rate or a video bit rate providing an acceptable quality, given cell loading conditions. In step S3 the power requirement for one or more or all available video qualities may be determined. This step may be performed in a radio resource management function, in the application server function and/or in a controller such as a radio network controller. Knowledge about the available video qualities or video bit rates may be required.

In case of HTTP adaptive streaming the available video bit rates are specified in a manifest file. In HTTP progressive download the original video may be transcoded/transrated into a plurality of different video qualities at different video bit rates. In step S3, equation 2 is used to determine the required power for each video quality and each streaming user.

In step S4, a video quality with the video bit rate fulfilling a required condition may be estimated. This step may be performed in a radio resource management function in the application server function and/or in a controller such as a radio network controller. In some embodiments, the following condition is estimated by comparing the required downlink power $P_{required,k}$ with a maximum power $P_k$ that can be allocated to each user k $$P_{required,k} \leq P_k, \quad (3)$$

where $P_k$ is an initial available power for each streaming user. The initial value of $P_k$ can be set for example in such a way that the bit rate of user k is shared by the number of non-GBR users in the cell. In the following the initial bit rate for user k may be $$BR_k = \frac{ABR_k}{K}, \quad (4)$$

with K as the total number of active non-GBR users. Then, by making use of (2) the initial available power for each streaming user $P_k$ is given as $$P_k = \beta_k \cdot P_{non-GBR} \cdot \frac{BR_k}{ABR_k} = \beta_k \cdot \frac{P_{non-GBR}}{K}, \quad (5)$$

where $\beta_k$ is a parameter used for optimization. In some situations, not all users will require all resources in all TTIs. Thus, the initial bit rate chosen in (4) may be a pessimistic value. Furthermore, a user located at the cell-edge may require more power (more TTIs) for the transmission of the same video quality than a user located at the cell-center. Therefore, the optimization parameter $\beta_k$ may be used to correct $P_k$ for example by an iterative approach based on the observed other data traffic as well as not exceeding $P_{non-GBR}$.

In some embodiments, $P_{non-GBR}$ may be replaced by a power usable for example with content such as video content, or any other allocated power value. K may be replaced by the number of user equipment sharing that allocated power value.

Thus in some embodiments, the problem of finding the optimal video bit rate and power distribution maximizing the video QoE for all users may be solved with an iterative approach, such as the well-known water filling algorithm.

In order to further improve the video optimization with the approach described above, a cell load/congestion indicator for video streaming can be used to reduce/enhance the video quality. For example, as soon as the cell load caused by video streaming users is above a certain threshold the video quality of certain users can be reduced in order to increase the cell capacity. In some embodiments, the actual cell load indicator in for example an HSDPA system can be calculated as $$\lambda[\%] = \frac{P_{Video} + P_{SCCH} + P_0}{P_{HSDPA}} \cdot 100 \quad (6)$$

where $P_{SCCH}$ is the estimated power required for the control channel HS-SCCH, $P_0$ is an offset parameter, $P_{HSDPA}$ is the total allocated transmission power for HSDPA, $\lambda$ is the load indicator and $P_{Video}$ is the total required downlink transmission power for all video streaming users defined as $$P_{Video} = \sum_{k=1}^{N} P_{required,k}, \qquad (7)$$

where N is the number of active video streaming user in the cell and $P_{required,k}$ can be estimated according to (2). The cell load indicator defined in (6) gives an good estimation of the current cell congestion.

Some embodiments may use an iterative algorithm, such as water filling, to select one of the video qualities (video bit rate) available. The selected video quality is "optimal" in the sense of power allocation, thus maximizing the QoE for all video streaming users in the cell. In general there may be several video qualities available, e.g. low, medium, high, etc. Each video quality requires a different video bit rate (e.g. also depending on the video fragment) to play the video smoothly. In the following it is assumed that the non-GBR power is available for all video streaming users in the cell. Some embodiments relate to how to split this power among the users so that each of them are able to watch the video with good quality.

With the approach in equation (5) it is possible to calculate the power requirement for each user and each video quality. With this information it is possible to start optimizing with an iterative algorithm, beginning by splitting the overall non-GBR power by the number of users ($\beta$=1 for all users). Consider the following simplified example: there are two user equipment in the cell (one in the cell center and one at the cell-edge) and there are two video qualities (low, high). The low video quality requires 150 kbit/s and high quality one 1 Mbit/s. The non-GBR power is equally split in the first step. According to equation (5) e.g. the cell edge-user equipment requires ¾ of the overall power to achieve 1 Mbit/s (high video quality) and ¼ for the low quality, whereas the cell center user equipment requires only ¼ of the overall power for the high quality video because of its good radio conditions. Therefore, $\beta$=¼ of the power is allocated to the cell center user equipment and $\beta$=¾ of the power to the cell-edge user equipment. Thus, both users can watch the high quality video by optimizing the power split or the bit rate respectively. Clearly, this optimization problem is more complex with more users and more video qualities available. Thus, by reducing the power allocated for one user, more power can be given to other users.

Accordingly in some embodiments, $\beta$ may be dependent on the position of the user equipment in the cell with a larger value the further from the cell center. In some embodiments, $\beta$ may be dependent on the signal strength required by a UE to receive a signal. In some embodiments, $\beta$ may be dependent on the SINR experienced by the user equipment or to other interference measure. In some embodiment, $\beta$ may be dependent on one or more of the above factors or any other suitable factor.

Reference is made to FIG. 6 which shows schematically functions of an iterative algorithm of some embodiments. It should be appreciated that some embodiments may use a single iterative algorithm whilst other embodiments may use two or more algorithms. The two or more algorithms may interact. In some embodiments, one or more algorithms may be fed into at least one other algorithm.

In step T1, $\beta$ is calculated for each of the k user equipment. The iterative algorithm may be such that the following condition is supported $1 = \Sigma_0^k \beta k$. In other word, the sum of $\beta$ for each of the k user equipment will be equal to one. It should be appreciated that the value of $\beta$ selected for a particular user may take into account one or more of the following parameters: the position of the user equipment in a cell, the subscription category of a user equipment, capabilities of the user equipment, type of service requested by a user equipment and/or signal strength. Of course one or more different parameters may additionally or alternatively be taken into account.

The iterative algorithm may be run to ensure that $1 = \Sigma_0^k \beta k$ is satisfied.

In step T2, the $P_k$ for each user is calculated using the respective $\beta$.

In step T3, the $P_{required}$ for each user equipment is determined. It should be appreciated that one or more different $P_{required}$ values may be determined for a respective user, depending on the video bit rate. In some embodiments, a candidate $P_{required}$ for each user is selected and the step is run until the total $P_{required}$ for all the user equipment is less than or equal to a given amount. This may be $P_{non-GBR}$ or a power value less than $P_{non-GBR}$ which is to be used for video downloads, for example. This may be $P_{video}$ mentioned previously or any other suitable value. As mentioned about this power value may be selected in dependence on for example cell congestion.

In step T4, the iterative algorithm will then be run to compare the value $P_{required}$ with the value $P_K$ for each user. If $P_{required}$ is less than $P_k$ then the associated video bit rate may be supported and if not then the associated video bit rate may not be supported. This step and/or one or more of the previous steps may be re-run until a desired result is achieved. This desired result may be that as many as possible user equipment received a desired bit rate, that at least a certain category of user equipment receive a relatively high quality bit rate and/or any other suitable criteria.

In step T5, the video bit rates to be used with each user equipment are available.

The algorithm is iteratively run to ensure that each user equipment preferably receives at least its specified minimum desired video bit rate. It should be appreciated that as the service is a non-guaranteed bit rate, in some circumstances, even the lowest minimum video bit rate may not be available for a particular user.

The iterative algorithm may weight one or more of the user equipment in dependence on one or more of the following parameters: the subscription or subscription class of the user; the position of the user equipment in the cell and/or signal strength. Again, one or more different parameters may alternatively or additionally be used.

It should be appreciated that in other embodiments, the different steps may take place in any suitable order, other than the example shown in FIG. 6.

Reference is made to FIG. 5 which schematically shows an application server function. In FIG. 5, the RAN 39 is in communication with a mobile Gateway 324 via the application function 38. It should be appreciated that the mobile Gateway function 324 may be provided in the packet core. The mobile gateway MGW 324 may allow connections to networks such as the Internet or the like. The application server function 38 is schematically shown. A connection, for example in the form of the PDP context or radio access bearer 304 extends between the RAN and MGW and may be in either or both directions. For simplicity, a single connection 304 is shown. The data on the connection provided by the RAN or the MGW is intercepted by an off load router block 301. The data may for example be in the form of packets.

The packets are then provided to an off load function 312 of the offload router. The offload function may implement selective offload using for example an appropriate filter rule set. The rules may be matching rules and may for example look at the header of each packet. Depending on the result of the filtering or the like of the offload function 312, packets may be routed to an appropriate application. In this example, two applications are shown, application 1 and application 2. However, it should be appreciated that the number of applications provided may be more or less than two. The application may provide any suitable function.

The traffic which is not to be off loaded is passed through. The packets which are to be offloaded may be subject to address translation at address translator 310. For example, the address translator 310 may translate the user equipment address into an address which is used by an application in a virtual network domain in the application server function. The address translator 310 may provide a translation function on a packet when it has been offloaded and before the packet is directed to an appropriated application. The address translator 310 will reverse the address translation for packets which are provided by the respective application back to the carried out on the input side.

Some embodiments may use radio information in the selection of the bit rate.

Some embodiments may determine or calculate a video bit rate (which may maximize QoE) for each individual streaming user by taking the actual radio conditions into account.

In some embodiments, the selected bit rate is used to determine the actual bit rate with which the data is transmitted. This actual bit rate is controlled by the base station itself and/or RRM by means of link adaption.

Some embodiments may allow for the determination or calculation of a cell load indicator for video streaming users which may be quite accurate.

Some embodiments may estimate a downlink power requirement considering one or more of the required video bit rate, allocated transmission power, average bit rate, average SINR (signal to interference plus noise ratio) and number of active users.

Some embodiments, may determine an initial bit rate or power requirement for each user.

Some embodiments may provide an iterative optimization of an initial bit rate or power requirement to obtain a used video bit rate.

Some embodiments may provide relevant radio information, such as selected video bit rate or cell load indicator, to the local or remote video optimizer In some embodiments, the application server or server function may have access to radio information required for calculating the used video bit rate or the actual cell load. The application server or server function may extract the relevant radio information and may directly forward this information to a video optimizer (either the local or the remote video optimizer) or pre-process the radio information before sending to a video optimizer (either the local or the remote video optimizer).

In the case where the application server or server function pre-processes the radio information, this may be to determine the current cell load or the video bit rate to be used.

In the case where the radio information (either processed or not) is provided to a remote video optimizer, this information may be signaled to the remote video optimizer by making use of the HTTP or TCP header options.

It should be noted that a transparent termination of the HTTP/TCP protocol stack as well as deep packet inspection (DPI) may be provided at the video optimization entity in order to modify and intercept HTTP requests. Furthermore, knowledge about the video content information may be obtained, such as the available video qualities stored in a manifest file in case of HTTP adaptive streaming or the header information of the downloaded video file in case of HTTP progressive download.

In some embodiments, the application server may extract relevant radio information, such as the total allocated transmission power, average SINR and number of active users In some embodiments, the application server pre-processes the relevant radio information as previously described and calculates the video bit rate to be used and current cell load. Alternatively, this may be done by the by the video optimizer.

In some embodiments, the application server may signal the relevant radio information (pre-processed or non pre-processed) to a local or remote video optimizer.

In some embodiments, the video optimizer intercepts HTTP requests.

In some embodiments, the video optimizer selects an appropriate video quality or transcodes/transrates video according to the calculated video bit rate and current cell load if necessary.

In some embodiments, the optimizer may modify HTTP requests, for example in case that the requested quality for HTTP adaptive streaming should be changed.

It should be appreciated that embodiments can be applied to other technologies. By way of example, some embodiments may be used with Long Term Evolution (LTE). In this case, the required radio information for estimating the optimal video bit rate may be obtained at the base station (BS).

Some embodiments have been described in relation to video data. It should be appreciated that embodiment may be used with one or more different types of data in addition to or as an alternative to video data.

Some embodiments have been described in relation to HTTP protocols. It should be appreciated that other embodiments may be used with different protocols.

In some embodiments, as there is a local application server in the RAN, it is possible to adapt the video delivery to the current radio conditions in a cell and for specific users.

In some embodiments, one or more of the functions performed by the local application server function may be provided by a radio resource manager or the like. This may mean that the application server function is not present or not used in some embodiments.

An appropriately adapted computer program code product or products may be used for implementing some embodiments, when loaded on an appropriate data processing apparatus, for example for determining geographical boundary based operations and/or other control operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is also noted herein that while the above describes exemplifying embodiments of the invention, there are several variations and modifications which may be made to the disclosed solution without departing from the scope of the present invention.

The invention claimed is:

1. A method comprising:
    selecting, for at least a part of a set of data to be transmitted to a user equipment in a cell, a bit rate, wherein said bit rate is selected in dependence on radio conditions associated with said user equipment in said cell,
    wherein said selecting comprises determining for a candidate bit rate including the selected bit rate, an associated required power,
    wherein said determining comprises determining said associated required power depending on radio condition information,
    wherein said radio condition information comprises interference dependent information, and
    wherein said interference dependent information comprises an average bit rate achievable by said user equipment.

2. A method comprising:
    selecting, for at least a part of a set of data to be transmitted to a user equipment in a cell, a bit rate, wherein said bit rate is selected in dependence on radio conditions associated with said user equipment in said cell,
    wherein said selecting comprises determining for said user equipment a candidate maximum power,
    wherein said determining comprises determining said candidate maximum power in dependence on one or more parameters, and
    wherein said one or more parameters comprise one or more locations of said user equipment in said cell, subscription of said user equipment, a type of the user equipment, a type of service required by the user equipment, and signal strength.

3. A method comprising:
    selecting, for at least a part of a set of data to be transmitted to a user equipment in a cell, a bit rate, wherein said bit rate is selected in dependence on radio conditions associated with said user equipment in said cell,
    wherein said selecting comprises determining for said user equipment a candidate maximum power,
    wherein said determining comprises determining said candidate maximum power in dependence on one or more parameters, and
    wherein a value associated with said parameter is selected for each of a plurality of user equipment including the user equipment such that a total of each of said values satisfies a condition.

4. The method as claimed in claim 3, wherein each value divided by said total of each said values determines a respective share of the user equipment of a total available power.

5. The method as claimed in claim 4, wherein said total available power is dependent on loading in said cell.

6. A method comprising:
    selecting, for at least a part of a set of data to be transmitted to a user equipment in a cell, a bit rate, wherein said bit rate is selected in dependence on radio conditions associated with said user equipment in said cell,
    wherein said selecting comprises determining for a candidate bit rate including the selected bit rate, an associated required power, and
    wherein the method further comprises comparing information on said associated required power and a candidate maximum power to determine if said candidate bit rate is supportable.

7. A method comprising:
    selecting, for at least a part of a set of data to be transmitted to a user equipment in a cell, a bit rate, wherein said bit rate is selected in dependence on radio conditions associated with said user equipment in said cell; and
    running at least one iterative algorithm to select a respective bit rate for a plurality of user equipment including the user equipment in the cell such that a total power associated with said respective bit rates is less than or equal to a total available power.

8. An apparatus, comprising:
    at least one processor; and
    at least one memory including computer code for one or more programs, the at least one memory and the computer code are configured, with the at least one processor, to cause the apparatus at least to:
    select, for at least a part of a set of data to be transmitted to a user equipment in cell, a bit rate, said bit rate being selected in dependence on radio conditions associated with said user equipment in said cell;
    determine for a candidate bit rate including the selected bit rate, an associated required power;
    compare information on said associated required power and a candidate maximum power to determine if said candidate bit rate is supportable; and
    trigger the transmission of at least a part of the set of data to the user equipment in the cell using the scheduled bit rate.

9. An apparatus, comprising:
    at least one processor; and
    at least one memory including computer code for one or more programs, the at least one memory and the computer code are configured, with the at least one processor, to cause the apparatus at least to:
    select, for at least a part of a set of data to be transmitted to a user equipment in cell, a bit rate, wherein said bit rate is selected in dependence on radio conditions associated with said user equipment in said cell; and
    run at least one iterative algorithm to select a respective bit rate for a plurality of user equipment including the user equipment in the cell such that a total power associated with said respective bit rates is less than or equal to a total available power.

* * * * *